US00RE42432E

(19) United States
(12) Reissued Patent
Stover

(10) Patent Number: US RE42,432 E
(45) Date of Reissued Patent: Jun. 7, 2011

(54) ROTARY PRESSURE EXCHANGER

(75) Inventor: Richard L. Stover, Newton, MA (US)

(73) Assignee: Energy Recovery, Inc., San Leandro, CA (US)

(21) Appl. No.: 12/237,275

(22) Filed: Sep. 24, 2008

Related U.S. Patent Documents

Reissue of:
(64) Patent No.: 7,201,557
Issued: Apr. 10, 2007
Appl. No.: 11/120,387
Filed: May 2, 2005

(51) Int. Cl.
*F01D 3/00* (2006.01)

(52) U.S. Cl. ..... 415/104; 415/116; 415/202; 417/65; 417/92; 417/103; 417/375

(58) Field of Classification Search ..... 415/104, 415/116, 202; 417/64, 65, 92, 103, 375, 417/405; 91/503, 499
See application file for complete search history.

(56) References Cited

U.S. PATENT DOCUMENTS

| | | | | |
|---|---|---|---|---|
| 2,766,928 | A * | 10/1956 | Jendrassik | 417/64 |
| 2,800,120 | A * | 7/1957 | Jendrassik | 123/559.2 |
| 3,209,986 | A * | 10/1965 | Kentfield | 417/64 |
| 3,234,736 | A * | 2/1966 | Spalding | 60/39.45 |
| 4,887,942 | A * | 12/1989 | Hauge | 417/64 |
| 5,338,158 | A * | 8/1994 | Hauge | 417/64 |
| 5,988,993 | A * | 11/1999 | Hauge | 417/365 |
| 6,537,035 | B2 * | 3/2003 | Shumway | 417/64 |
| 6,540,487 | B2 * | 4/2003 | Polizos et al. | 417/65 |
| 6,659,731 | B1 * | 12/2003 | Hauge | 417/64 |
| 6,773,226 | B2 * | 8/2004 | Al-Hawaj | 415/116 |
| 7,306,437 | B2 * | 12/2007 | Hauge | 417/64 |

FOREIGN PATENT DOCUMENTS

| | | | |
|---|---|---|---|
| DE | 4421990 | A1 * | 1/1996 |
| GB | 967525 | * | 8/1964 |
| WO | WO 01/77529 | A2 | 10/2001 |
| WO | WO 0177529 | A2 * | 10/2001 |

OTHER PUBLICATIONS

John P. MacHarg, "How to Design and Operate SWRO Systems Built Around a New Pressure Exchanger Device", International Desalination Association, Log #BHR01-127, Session #6, 2001, pp. 1-8.*
Energy Recovery, Inc., "Isobaric Device Flow Performance in Arrays, How does the SWRO plant designer and operator control flow?", Energy Recovery Technical Bulletin, May 28, 2004, 3 pps.*
Energy Recovery, Inc., "65 Series Assembly Schematic Drawing No. 00800, Revision A", Energy Recovery, Inc., Oct. 25, 2002, 1page.*
Energy Recovery, Inc., "The PX Pressure Exchanger by Energy Recovery, Inc.", Energy Recovery, Inc., 2004, 1 page.*

* cited by examiner

*Primary Examiner* — Ninh H Nguyen
(74) *Attorney, Agent, or Firm* — Fitch, Even, Tabin & Flannery

(57) ABSTRACT

A pressure exchanger for the transfer of pressure energy from a high pressure fluid stream to a lower pressure fluid stream wherein a generally cylindrical housing contains a rotor having a plurality of channels extending axially therethrough and a pair of end covers which slidingly and sealingly interface with respective end faces of the rotor. The end covers are supported against deformation by high pressure upon the end covers in an inward direction, as by exerting a balancing comparable outward axial force upon inward surfaces of the end covers through the employment of pressure-balancing chambers that are in communication with a high pressure fluid region at one end cover.

23 Claims, 5 Drawing Sheets

ROTARY PRESSURE EXCHANGER

Matter enclosed in heavy brackets [ ] appears in the original patent but forms no part of this reissue specification; matter printed in italics indicates the additions made by reissue.

*CROSS REFERENCE TO RELATED APPLICATIONS*

*This application is a reissue application of U.S. Pat. No. 7,201,557.*

FIELD OF THE INVENTION

The invention relates to pressure exchangers where a first fluid under a high pressure hydraulically communicates with a second, lower pressure, fluid, and transfers pressure between the fluids. More particularly, the invention relates to rotary pressure exchangers wherein compensation is made for forces that may otherwise distort the components.

BACKGROUND OF INVENTION

Many industrial processes, especially chemical processes, operate at elevated pressures. These processes require a high pressure fluid feed, which may be a gas, a liquid or a slurry, to produce a fluid product or effluent. One way of providing a high pressure fluid feed to such an industrial process is by feeding a relatively low pressure stream through a pressure exchanger to exchange pressure between a high pressure waste stream and the low pressure feed stream. One particularly efficient type of pressure exchanger is a rotary pressure exchanger wherein a rotating rotor having axial channels establishes hydraulic communication between the high pressure fluid and the low pressure fluid in alternating sequences.

U.S. Pat. Nos. 4,887,942; 5,338,158; 6,537,035; 6,540,487; 6,659,731; and 6,773,226, the disclosures of which are incorporated herein by reference, discuss rotary pressure exchangers of the general type described herein for transferring pressure energy from one fluid to another. This type of pressure exchanger is a direct application of Pascal's Law: "Pressure applied to an enclosed fluid is transmitted undiminished to every portion of the fluid and to the walls of the containing vessel." Pascal's Law holds that, if a high pressure fluid is brought into hydraulic contact with a low pressure fluid, the pressure of the high pressure fluid is reduced, the pressure of the low pressure fluid is increased, and such pressure exchange is accomplished with minimum mixing. A rotary pressure exchanger of this type applies Pascal's Law by alternately and sequentially bringing a channel which contains one lower pressure fluid into hydraulic contact with another higher pressure fluid thereby pressurizing the one fluid in the channel and causing some fluid that was in the channel to exit to the extent that higher pressure fluid takes its place, and thereafter bringing the channel into hydraulic contact with a second chamber containing the incoming stream of lower pressure fluid which pressurizes the fluid in the chamber sufficiently to cause some of the other fluid in the channel to exit at still lower pressure.

The net result of the pressure exchange process, in accordance with Pascal's Law, is to cause the pressures of the two fluids to approach one another. The result is that, in a chemical process, such as sea water reverse osmosis, for example, operating at high pressures, e.g., 700-1200 pounds per square inch (psi), where a seawater feed is generally available at low pressures, e.g., atmospheric pressure to about 50 psi, and a high pressure brine from the process is available at about 700-1200 psi, the low pressure seawater and the high pressure brine can both be fed to such a pressure exchanger to advantageously pressurize seawater and depressurize waste brine. The advantageous applicable effect of the pressure exchanger on such an industrial process is the reduction of high pressure pumping capacity needed to raise the feed stream to the high pressure desired for efficient operation, and this can often result in an energy reduction of up to 65% for such a process and a corresponding reduction in required pump size.

In such a rotary pressure exchanger, there is generally a rotor with a plurality of open-ended channels. Rotation of the rotor is driven either by an external force or by the directional entry of the high pressure fluid into the channels, as known in this art. Rotation provides alternating hydraulic communication of the fluid in one channel exclusively with an incoming high pressure fluid in one of the opposite end chambers and then, a very short interval later, exclusively with an incoming low pressure fluid in the other end chamber. As a result, axially countercurrent flow of fluid is alternately effected in each channel of the rotor, creating two discharge streams, for example a reduced pressure brine stream and an increased pressure seawater stream.

In such a rotary pressure exchanger having a rotating rotor with a plurality of substantially longitudinal channels extending through the rotor, there will be many very brief intervals of hydraulic communication through between chambers at the opposite ends holding the two fluids which are otherwise hydraulically isolated from each other. Minimal mixing will occur in the channels because operation is such that the channels will each have a zone of relatively dead fluid that serves as a buffer or interface in that channel between the fluids which enter and exit from one respective end. This permits the high pressure brine to transfer its pressure to the incoming low pressure seawater stream without mixing.

The rotor usually rotates in a cylindrical sleeve or housing, with its flat end faces slidingly and sealingly interfacing with end cover plates. These end covers are peripherally supported by contact with the sleeve and have separate inlet and discharge openings for alternately mating with the channels in the rotor. As a result, these channels alternately hydraulically connect with, for example, an incoming high pressure brine stream and then with an incoming low pressure seawater stream; in both instances, there is discharge of liquid from the opposite end of the channel. As the rotor rotates between these intervals of alternate hydraulic communication, channels are briefly sealed off from communication from both openings in each of the end covers.

The rotor in the pressure exchanger is often supported by a hydrostatic bearing and driven by either the flow of fluids into and through the rotor channels or by a motor. To achieve extremely low friction, such a pressure exchanger usually does not use rotating seals, but instead, fluid seals and fluid bearings are used. Extremely close tolerance fits are used to minimize leakage.

To minimize such leakage and to improve the dimensional stability of constructional materials, improvements in rotary pressure exchangers of this type are continually being sought.

SUMMARY OF THE INVENTION

The end covers which have flat inward end faces that slidingly and sealingly interface with flat end faces of the rotor are important components of a rotary pressure exchanger of this type. During operation, and particularly during high pressure operation such as might be encountered in seawater reverse osmosis (SWRO), the incoming brine stream may be at a pressure which is 700-1200 psi greater than that of the incoming seawater stream. To provide dimensional stability of these components, it was found to be important that attention be given to these great differences in pressure.

It has been found that improved operation and stability of rotary pressure exchangers utilizing such end covers can be accomplished by supporting inward facing surfaces of the end faces, preferably by balancing the forces to which these end covers are constantly being subjected during operation. Under a normal SWRO arrangement, the outward end faces of the two end covers will be respectively subjected either to the pressure of the high pressure incoming stream of brine, or to the pressure of the high pressure outgoing stream of seawater while the inward end faces will be supported only peripherally where they contact the sleeve. It has been found that by providing central support, preferably by balancing these pressures, improved overall operation and dimensional stability of the end covers will result. Such balancing, when employed, can be effected in various ways, including providing a chamber within the rotor itself and using that chamber to balance the inward and outward forces on both end covers by pressurizing that chamber through communication with either the high pressure incoming brine stream or the pressurized seawater discharge stream.

In one particular aspect, the present invention provides a pressure exchange apparatus for transferring pressure energy from a high pressure first fluid to a lower pressure second fluid to provide a pressurized second fluid, which apparatus comprises: a rotatably mounted cylindrical rotor having a pair of opposite planar end faces with at least two channels extending axially therethrough and between openings located in said planar end faces; a pair of end covers having inward and outward end faces, with said inward end faces interfacing with and slidingly and sealingly engaging said end faces of said rotor, each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover plate being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover; at least one pressure-balancing chamber which is in fluid communication with an inward-facing surface of at least one said end cover; and means connecting said chamber to either the high pressure first fluid or to the pressurized second fluid so that last-named end cover is subjected to relatively equal forces upon said inward and outward end faces thereof.

In another particular aspect, the present invention provides a pressure exchange apparatus for transferring pressure energy from a high pressure first fluid to a lower pressure second fluid to provide a pressurized second fluid, which apparatus comprises: a rotatably mounted cylindrical rotor having a pair of opposite planar end faces with at least two channels extending axially therethrough and between openings located in said planar end faces; a tubular sleeve surrounding said rotor in which said rotor rotates; a pair of end covers having inward and outward end faces, with said inward end faces contacting end faces of said sleeve and interfacing with and slidingly and sealing engaging said end faces of said rotor, each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover plate being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover; and means for supporting central regions of said inward end faces of said end covers so that axial forces on the respective outward end faces do not deform said end covers.

In a further particular aspect, the invention provides a method for transferring pressure energy from a high pressure first fluid stream to a lower pressure second fluid stream using a pressure exchanger, which method comprises: supplying the high pressure first fluid stream to an inlet passageway in a first end cover at one end of the pressure exchanger to direct said first fluid to a rotating cylindrical rotor having a pair of opposite, generally planar end faces with at least two channels extending axially therethrough and between openings located in the opposite end faces; supplying the lower pressure second fluid stream to an inlet passageway in a second end cover at an opposite end of the pressure exchanger to direct said second fluid into opposite ends of the channels in the rotating rotor, each of the end covers having inward and outward end faces, which inward end faces interface with and slidingly and sealingly engage the respective end faces of the rotor, each end cover also having one discharge passageway in addition to the inlet passageway, which passageways in each end cover are angularly separated from each other so that each channel in the rotor can communicate with only one passageway in each end cover at the same time, rotation of said rotor causing said channel openings, in alternating sequence, to be brought into partial or full alignment with an inlet passageway in one end cover and a discharge passageway in the other end cover, and then into partial or full alignment with a discharge passageway in the one end cover and an inlet passageway in the other end cover; said high pressure first fluid being supplied to said first end cover via an inlet chamber that is in fluid communication with the outward end face of the first end cover, and said pressurized second fluid being discharged from the pressure exchanger through a discharge chamber that is in fluid communication with the outward end face of said second end cover, and supporting inward end faces of the end covers against deformation by axial forces that are applied by said high pressure first fluid stream and said pressurized second fluid stream to outward end faces thereof.

DETAILED DESCRIPTION OF THE PREFERRED EMBODIMENTS

Although as earlier indicated, rotary pressure exchangers can be used in many industrial processes where there is a high pressure fluid stream that is no longer needed at such high pressure conditions and a low pressure fluid stream for which it is desirable to raise its pressure, one present application that has found considerable commercial interest is that of seawater desalination using reverse osmosis membrane cartridges or elements disposed within pressure vessels. Therefore, although it should be understood that any suitable fluids, e.g. gases, liquids, slurries, etc., may comprise the high pressure stream and/or the lower pressure stream between which pressure exchange is to be carried out, for purposes of convenience, the description which follows is set forth in terms of a high pressure liquid brine stream being used to substantially raise the pressure of a low pressure seawater feedstream.

Accordingly, although the following description is written in terms of a brine stream and a seawater stream, it should be understood that such rotary pressure exchanger operation may be used to transfer pressure energy from various high pressure first fluid streams to various low pressure second fluid streams. Similarly, although the term "high pressure" is used for convenience, it should be understood that high is used in a relative sense and that it may be worthwhile to use the rotary pressure exchanger to transfer energy from fluids over a wide range of pressures. Generally, the greater amount of pressure energy that can be recovered from a high pressure stream that may be considered to be an effluent or the like, e.g. one that will be perhaps returned to the environment, the more advantageous will be the overall operation from an energy saving standpoint.

Figure 1:
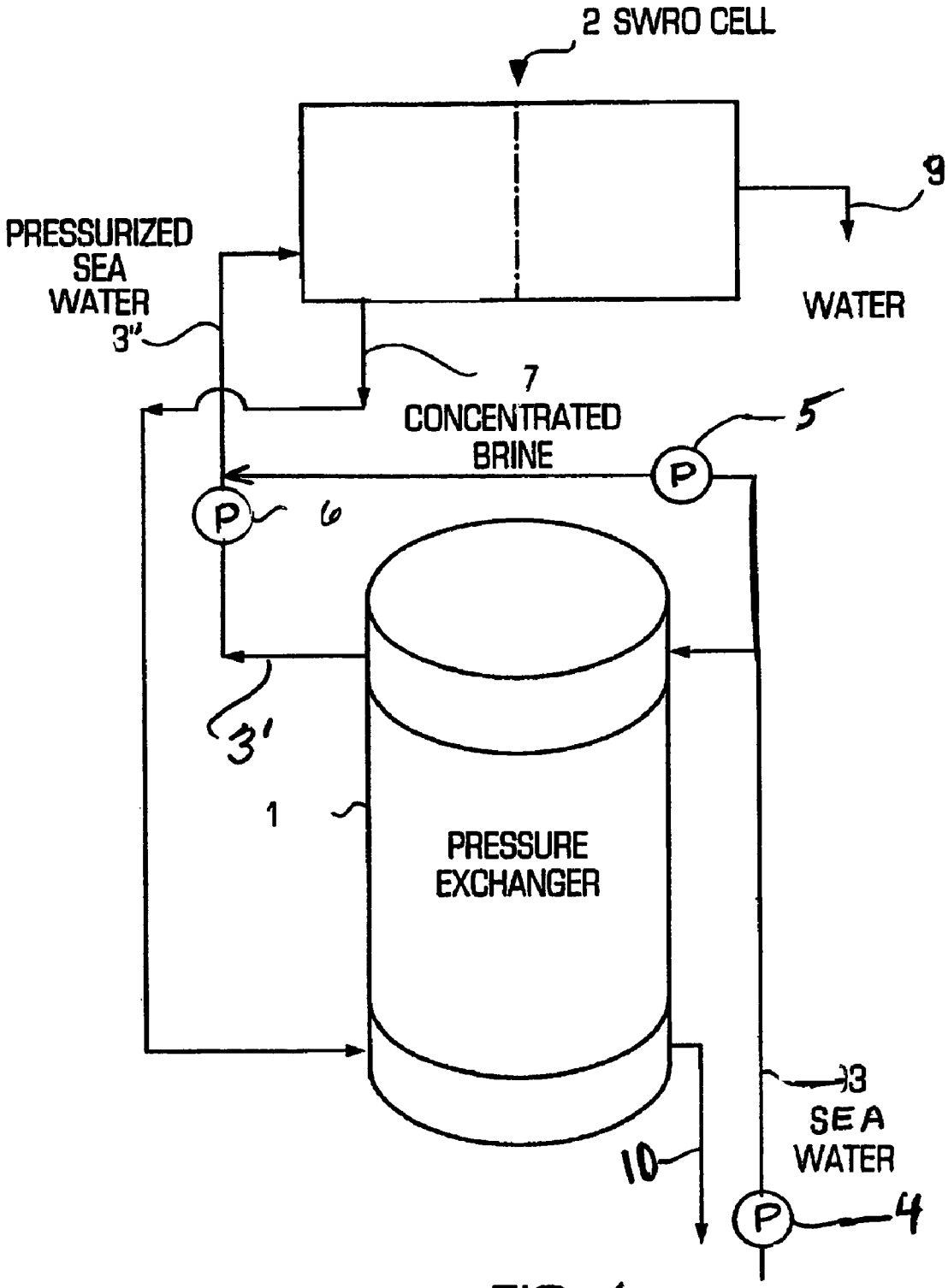
FIG. 1 is a schematic view of an SWRO process wherein seawater is supplied under pressure to a rotary pressure exchanger where its pressure is very substantially raised by exchange with a high pressure brine stream exiting from an SWRO membrane cartridge unit.

Depicted in FIG. 1 is a schematic representation of such an SWRO system which includes a rotary pressure exchanger 1 and an SWRO cell 2 which may comprise a plurality of RO membrane elements, for example, elements of a spirally wound character that are disposed within a pressure vessel. An incoming stream 3 of seawater is supplied by a main seawater supply pump 4 that may raise its pressure to 30 psi or greater. A major portion of the pumped stream 3 of seawater enters a low pressure inlet of the rotary pressure exchanger 1, while the remainder of the stream flows to the suction side of a main, high pressure pump 5. The seawater that enters the rotary pressure exchanger 1 exits as a pressurized seawater stream 3' and flows into the suction side of a booster pump 6. The discharge from the booster pump 6 joins the discharge from the main high pressure pump 5 to become the pressurized seawater stream 3" which constitutes the feed flow to the SWRO cell. The SWRO cell 2 employs cross-flow filtration and uses a semipermeable reverse osmosis membrane to create a product stream of purified, usually potable, water and a retentate or brine stream 7. If the feed pressurized water stream 3" enters the SWRO cell at, for example, about 1000 psi, the brine discharge stream 7 may have a pressure of about 970 psi, and the flow rate of the brine exiting the cell may equal about 60-70% of the flow rate of the feedstream 3", with the remainder constituting the purified water permeate stream 9. The concentrated brine stream 7 flows through a high pressure inlet at the opposite end of the rotary pressure exchanger 1 and gives up most of its pressure energy to the incoming seawater stream 3, and a brine discharge stream 10 exits the pressure exchanger at near atmospheric pressure. If desired, a minor portion of the high pressure brine stream 7 can be added to the seawater stream 3" for a second pass through the SWRO cell, as is well known in the desalination art.

In summary, the rotary pressure exchanger 1 utilizes the pressure energy of the high pressure brine effluent stream 7 as a source to pressurize a large percentage of an incoming seawater feed to provide a substantial portion of the high pressure feedstream 3" which is supplied to the SWRO cell 2. The brine discharge stream 10 from the pressure exchanger is commonly returned to the environment, e.g. the ocean, other source of seawater, or the like.

Figure 2:
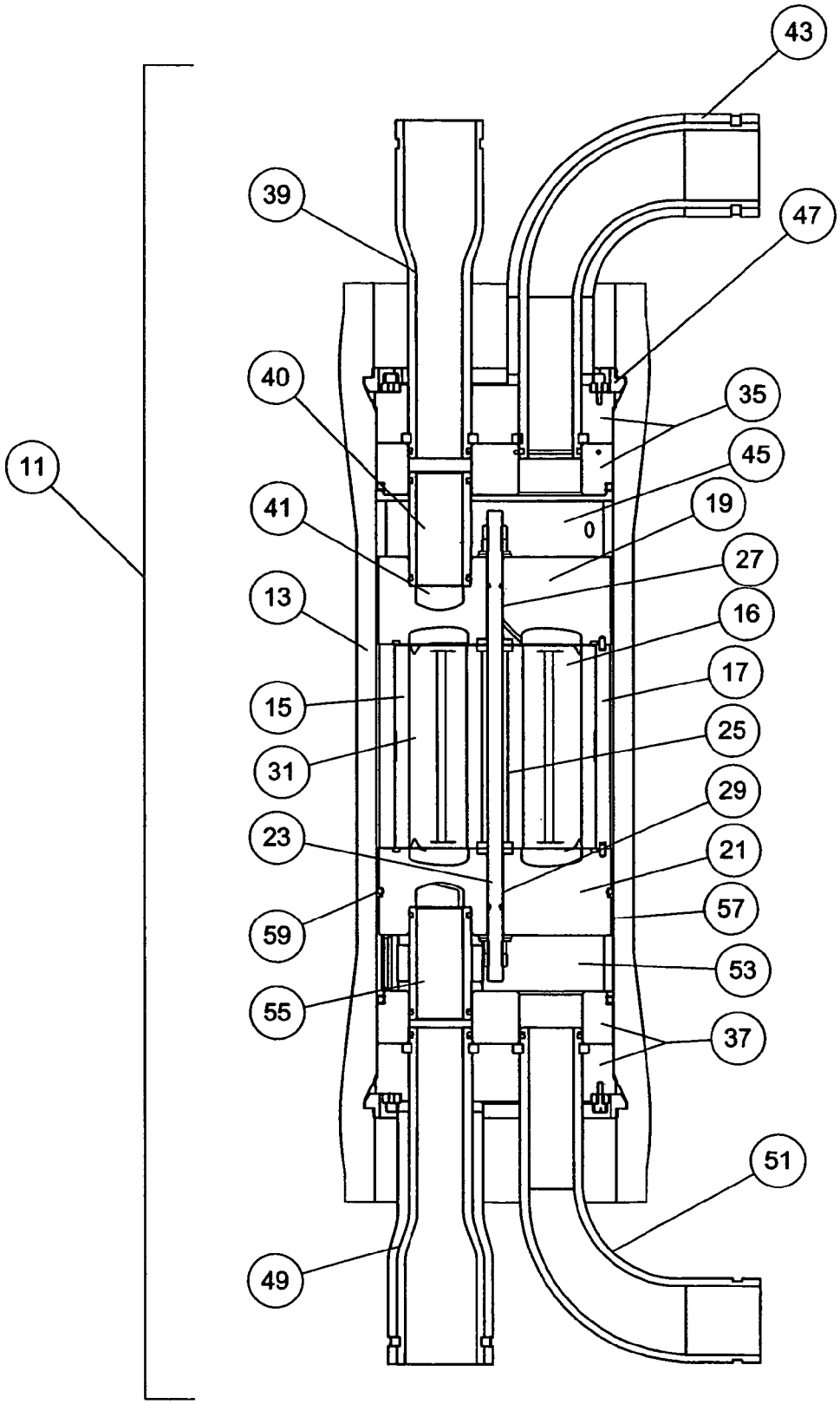
FIG. 2 is a vertical cross-sectional view of a rotary pressure exchanger incorporating various features of the present invention.

Disclosed in FIG. 2, in cross-sectional view, is one embodiment of a rotary pressure exchanger 11 which embodies various features of the present invention. The rotary pressure exchanger 11 includes an elongated, generally cylindrical housing or body portion 13, within which there is disposed a cylindrical rotor 15 that has a plurality of channels 16 which extend end-to-end and a surrounding sleeve 17 in which it rotates. Axially flanking the rotor are a first or upper end cover 19 and a lower end cover 21. The terms "upper" and "lower" are merely used for convenience of orientation and description consistent with the layout of FIG. 2, as it should be understood that the pressure exchanger 11 may be operated in any orientation, vertical, horizontal or otherwise. To permit the two end covers 19, 21, the rotor 15 and the sleeve 17 to be handled as a unit (FIG. 3), they are united through the use of a central rod or shaft 23 which is located in a elongated chamber 25 disposed generally axially of the rotor and in a pair of aligned axial passageways 27, 29 in the upper and lower end covers. This threaded tension rod 23 resides in these three central chambers and is secured by washers, o-rings, and hex nuts or the like; it serves to position the rotor 15 between the end covers 19, 21, which are seated at their peripheries against end faces of the tubular sleeve 17, so that planar end faces of the rotor slidingly and sealingly interface with corresponding surfaces on the inward faces of both end covers. Preferably, short dowel pins 31 provide a means to hold the surrounding sleeve 17 and both end covers 19, 21 in precise alignment.

Again, for purposes of convenience of description, the pressure exchanger 11 is arbitrarily described as having the high pressure brine enter at the bottom and the low pressure seawater enter at the top. Upper and lower end closure plate assemblies 35, 37 are provided through each of which a pair of conduits pass. In the illustrated embodiment, the upper end closure assembly 35 includes a straight conduit 39 through which the low pressure seawater feedstream is supplied; this conduit 39 extends straight through both the upper and lower plates of the upper closure assembly 35 and connects to a nipple 40 and terminates in a seawater inlet or feed passageway 41 that extends through the upper (seawater) end cover 19. An elbow conduit 43 is also supported in the end closure assembly 35 which leads to an opening in the lower plate of the closure which opens onto a plenum chamber 45 which occupies this cylindrical section of the interior of the housing 13 except for the volume occupied by the seawater feed conduit 39. Once the end closure plate is installed, it is locked in place by a segmented locking ring 47 or the like as well known in this art.

The opposite end of the pressure exchanger 11 contains essentially similar components. The similar lower end closure plate assembly 37 supports a straight line brine discharge conduit 49 and an elbow conduit 51 through which the incoming stream of high pressure brine is supplied. The incoming brine conduit empties into a lower plenum chamber 53 in the region between the outward end face of the lower (brine) end cover 21 and the interior surface of the lower end closure plate assembly 37, whereas the low pressure brine discharge conduit 49 is connected by a nipple 55 in fluidtight arrangement to a discharge passageway in the brine end cover 21. The lower (brine) end closure plate assembly 37 is likewise locked in place by a standard locking ring assembly 47.

The cylindrical exterior surface 57 of the brine end cover 21 is formed with a groove wherein a sealing O-ring 59 or the like is seated to create a seal at this location within the housing 13. There is no comparable seal at the exterior surface of the seawater end cover so that manufacturing tolerances will allow some flow of the pressurized seawater into the region between the seawater end cover 19 and the interior wall of the housing and between the sleeve 17 and the interior wall of the housing. This flow extends into the interfacial regions between the end faces of the rotor 15 and the juxtaposed surfaces of the end covers 19, 21 and in effect provides a seawater-lubricated hydrodynamic bearing.

The end cover plates 19, 21 are generally mirror images of one another, and their construction is seen in FIGS. 4, 5, 6, 7 and 8 which shows the upper seawater end cover 19.

Figure 4:
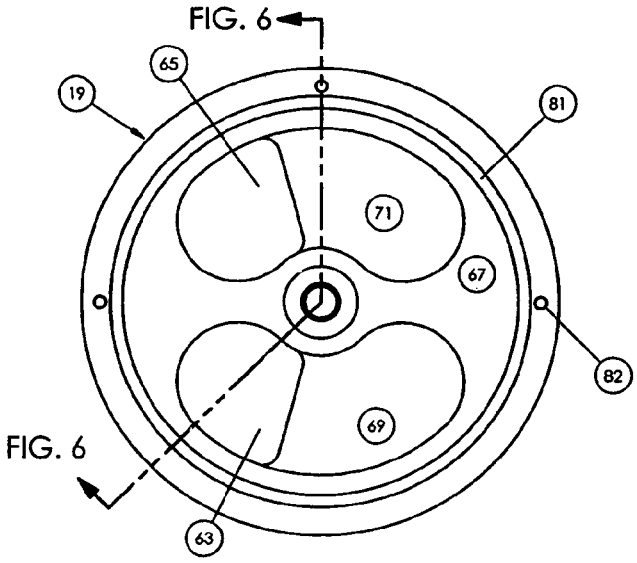
FIG. 4 is a front view of the upper end cover in the pressure exchanger illustrated in FIG. 2.
Figure 5:
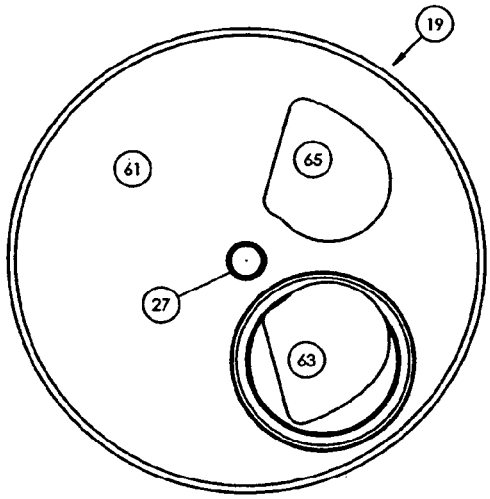
FIG. 5 is a rear view of the upper end cover of FIG. 4

FIG. 5 shows the outward end face 61 of the seawater end cover 19 wherein the circular cross-section entry to the seawater inlet passageway or chamber 63 is located in the lower semi-circular portion of the drawing, and the irregular-shaped exit opening from the pressurized seawater discharge passageway or chamber 65 appears in the upper semicircular region, with the chamber or cavity 27 which accommodates the threaded tension rod 23 being seen at the center. The seawater inlet passageway 63 expands arcuately from its cylindrical entrance region into the adjacent quadrant of one-half of the end cover to terminate in a kidney bean shaped aperture at the inward end face 67 of the seawater end cover 19. A good portion of the passageway expansion occurs near the inward end face 67 in the oblique ramps 69 and 71 which form surfaces of the expanding passageways 63 and 65. The angle of these ramps determines the amount of impetus that the inflowing pumped stream of seawater will have upon the far wall in each channel 16 of the rotor 15 and thus assists in determining the rotational speed thereof (in combination of course with the similar effect that is occurring at the opposite end where the pressurized brine is similarly flowing through the mirror image end cover 21 as it exits from a brine inlet passageway or chamber in the brine end cover). As can be seen from FIG. 4, the opening into the seawater discharge passageway 65 in the inward end face 67 is also of kidney bean shape, and it includes a generally similar entrance ramp surface 71.

Figure 6:
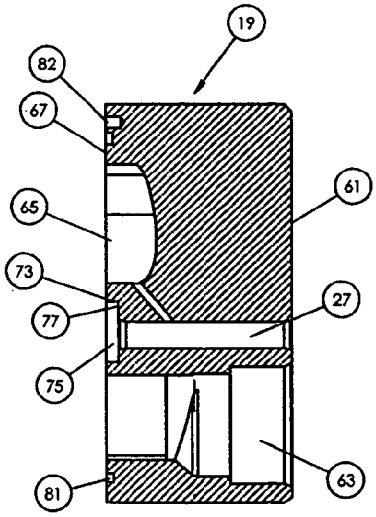
FIG. 6 is a sectional view taken generally along the line 6-6 of FIG. 4.

The balancing effect of the present invention utilizes the oversize nature of the axial cavity 27 in the seawater end cover 19, with respect to the diameter of the tension rod 23 that passes therethrough. As seen in FIG. 6, an oblique bleed passageway 73 extends from the high pressure region of the pressurized seawater discharge passageway 65 through the body of the end cover 19 and into the axial cavity 27 therein. As a result, the axial cavity 27, during operation, will be at the same pressure as the pressurized seawater being discharged.

With respect to orientation of the cross-sectional view shown as FIG. 6, during operation the right hand or outward end face 61 of the end cover 19 will be subjected to axially inward forces from the high pressure seawater discharge that will fill the plenum chamber 45 for which the end face 61 is one boundary; only the periphery of the end cover 19 is supported by engagement with the sleeve 17. To provide a balancing axial force in a central region of the end cover 19, axial passageway 27 is provided with a counterbore 75 at the inward face which creates an annular surface 77 that is parallel to the outward end face 61. As a result, hydrostatic pressure will apply a balancing, axially outward force, as a result of the communication of high pressure through the bleed passageway 73, to this central region of the end cover 19, which supports it against potential deformation.

In the illustrated preferred embodiment, the axial cavity or chamber 25 through the rotor is likewise oversize with respect to the diameter of the tension rod 23 so that such seawater discharge pressure also communicates to this axial cavity, extending from end to end of the rotor 15. In this preferred embodiment, a similar axially outward, balancing force is likewise applied against a central region of the inward face of the brine end cover 21 which has a similar counterbore and annular surface. As previously mentioned, the brine end cover 21 is essentially a mirror image of the seawater end cover except for the absence of the oblique bleed passageway 73, as can be generally seen in the cross-sectional assembly view of FIG. 2. However, if desired, a second balancing pressure bleed passageway could be provided in the brine end cover 21 extending from the high pressure brine inlet passageway in the end cover to its central cavity 29. If this option were employed, then a seal somewhere in the axial cavity 25 in the rotor 15 might be used to block any flow of high pressure brine through the center axial cavity of the rotor.

As known in this art, the rotor 15 revolves on hydrodynamic bearings at the interfaces between each end face of the rotor 15 and the respective inward end face of each end cover, and all are machined to close tolerances so these interfacing surfaces are essentially in sliding and sealing contact with each other with only an extremely thin layer of fluid therebetween. As a result, there is no fluid flow radially at this interface so that the high pressure intake or discharge passageway in each end cover is sealed from the adjacent low pressure passageway at the interface. As best seen in FIG. 4, the seal is provided by the separation for an annular region of about 40°, which is well known in this art. The hydrostatic bearing effect is enhanced by an annular groove 81 which appears in the inward end face 67 of the end cover 19 near its periphery surrounding the intake and discharge passageway exits/entrance, where a static reservoir of high pressure water accumulates. Likewise, the inward end faces of the end covers 19, 21 preferably include drilled blind holes 82 to receive the short dowel pins 31 that align the end covers and the sleeve 17.

Figure 3:
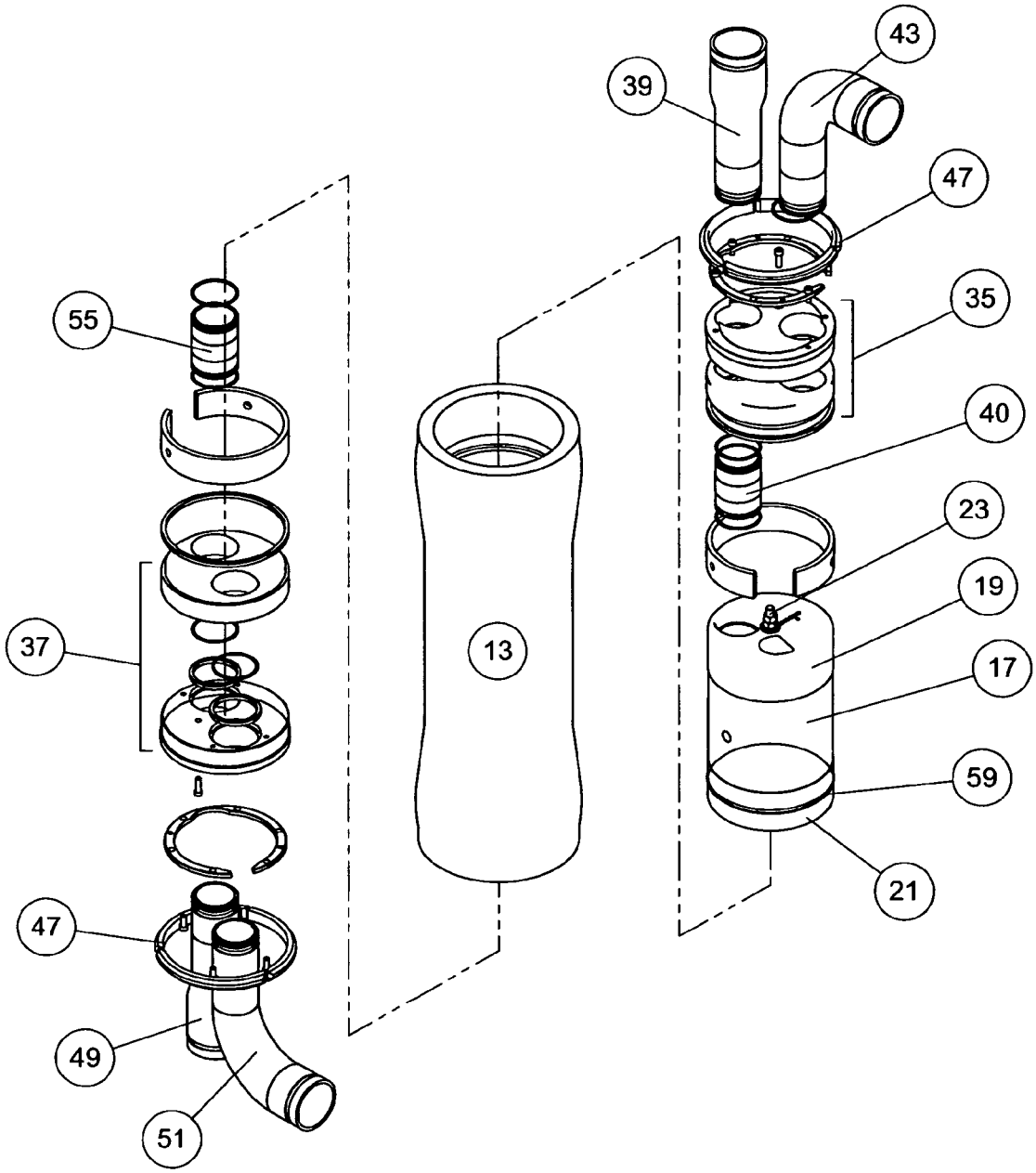
FIG. 3 is an exploded perspective view of the rotary pressure exchanger shown in FIG. 2.

In operation, the preferred embodiment pressure exchanger 11 that is seen in FIGS. 2 and 3 would have low pressure seawater, for example at a pressure of about 30 psi, being pumped to the straight line inlet conduit 39 at the upper end and high pressure brine being discharged from the SWRO cell supplied to the elbow inlet conduit 51 at the lower end. Accordingly, the low pressure seawater would fill the inlet passageway 63 in the upper end cover 19, and the high pressure brine would fill the plenum chamber 53 and flow through the inlet passageway in the lower brine end cover 21 and enter the axial channels 16 in the rotor 15 causing it to spin. The seawater in these channels 16 would be instantly pressurized and caused to flow out the upper end of the channels whenever there was alignment of the channel 16 with the opening to the discharge seawater passageway 65 in the upper seawater end cover. Such would cause the pressurized seawater to fill the upper plenum chamber 45 and exit from the pressure exchanger 11 through the elbow discharge conduit 43 at the top of the pressure exchanger. Similarly, when a channel 16 in the rotor was alternately aligned with the opening to the seawater inlet passageway 63 in the seawater end cover 19 and respectively with the opening to the brine discharge passageway in the brine end cover 21, the 30 psi seawater would force brine out of the pressure exchanger 11 through the straight line low pressure brine discharge conduit 49 so that seawater again fills at least the upper portion of the channel. High pressure seawater from the plenum chamber 45 finds its way along the interior surface of the cylindrical housing as far as the sealing ring 59 on the lower brine end cover 21. Some of this high pressure seawater flows into the clearances between the rotor, sleeve and end covers, and this flow contributes to the hydrodynamic bearing effect. During the operation, the oblique bleed passageway 73 leading from the pressurized seawater discharge passageway 65 in the seawater end cover 19 pressurizes the axial cavity 27 therein. The axial cavity 25 in the center of the rotor communicates this high pressure to the counterbore of the axial cavity 29 in the brine end cover 21, and thus axially inward balancing forces are exerted upon the annular surfaces provided by the counterbores located centrally in the inward face of each end cover. Liquid within this system is static, as there is no flow because the outward ends of the axial cavities 27, 29 in the end covers are sealed by washers and end nuts that secure the tension rod 23 in place. As a result of this arrangement, the forces operating on the end covers 19, 21 (which can indeed be substantial when a pressure exchanger 11 is, for example, handling brine at a pressure of 1000 psi or greater) are very effectively balanced. This force balance resists potential dish-like distortion of the end covers, which are rigidly supported at their respective peripheries, when they are subjected to high pressures, thereby providing the benefit of dimensional stability in an apparatus of this type where it is important that close tolerances be maintained.

Figure 7:
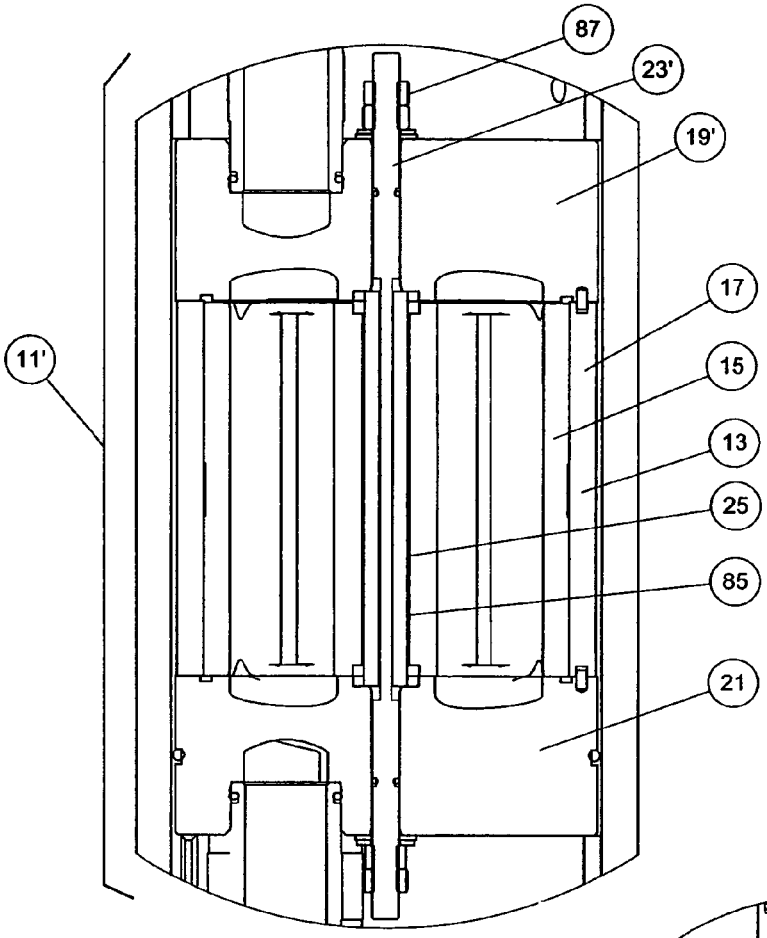
FIG. 7 is a fragmentary view of an alternative embodiment of a pressure exchanger.

Illustrated in FIG. 7 is a fragmentary cross-sectional view similar to that shown in FIG. 2 of an alternative embodiment of a pressure exchanger 11' which supports the end covers against potential distortion from high pressure in a different manner. The pressure exchanger 11' uses a similar housing 13, a similar rotor 15 and sleeve 17, and a similar lower end cover 21. However, an upper end cover 19' is utilized that does not include the bleed passageway 73. Instead, a thinner, threaded tension rod 23' is used which provides space within the axial cavity 25 in the rotor for a thin, rigid tube 85 to be disposed. The tube 85 may have a sliding fit on the tension rod and extend from end cover 19' to end cover 21 in the central cavity 25 of the rotor. The tube is preferably seated, at each respective end, in the counterbore 75 of the respective end cover, which counterbores could be reduced in diameter from those shown, if desired. Alternatively, the counterbores could be eliminated, and the rigid tube 85 could simply abut the central annular region of each inward end face 67 of the end covers.

In the construction illustrated in FIG. 7, when the two end covers, the rotor 15 and the sleeve 17 are assembled as a unit, the support tube 85 surrounds the tension rod in the central cavity 25 of the rotor. When locking nuts 87 are tightened at both ends of the tension rod 23', the end covers 21 and 19' are supported peripherally where they contact the end faces of the sleeve 17 and centrally where they contact the end faces of the support tube 85. As a result, during operation, this support of the end covers at spaced apart inner and outer annular regions effectively resists deformation as a result of axial pressure differences.

Figure 8:
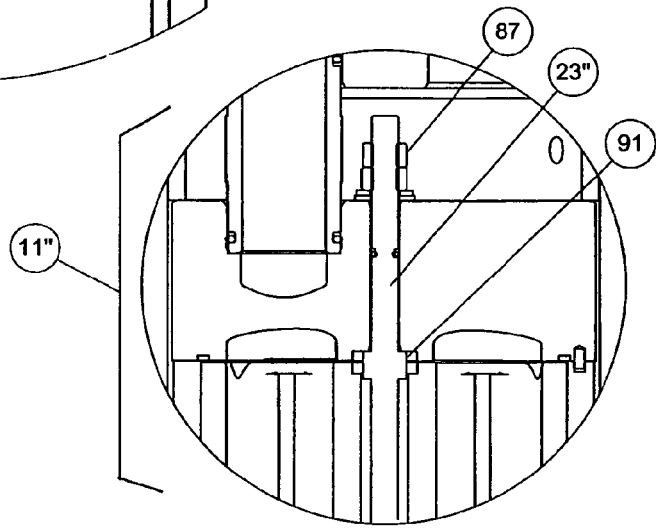
FIG. 8 is a fragmentary view of another alternative embodiment of a pressure exchanger.

Illustrated in FIG. 8 is a further alternative embodiment having some resemblance to the FIG. 7 embodiment. A pressure exchanger 11" is shown which utilizes a slightly different form of central mechanical support for the end covers. Rather than disposing a rigid tube slidingly on the reduced diameter tension rod, a pair of circular flanges 91 are welded or otherwise suitably affixed to a tension rod 23" at locations where they will extend axially beyond the opposite end faces of the rotor 15. These rigid flanges 91 then abut the inward end faces 67 of the end covers when the lock nuts 87 are tightened on the opposite ends of the tension rod 23" and perform the same support function as did the rigid tube 85 in the FIG. 7 embodiment.

Although the invention has been described with regard to certain preferred embodiments which constitute the best mode presently known to the inventors for carrying out the invention, it should be understood that various changes and modifications as would be obvious to one having ordinary skill in this art may be made without deviating from the scope of the invention which is defined in the claims appended hereto. For example, although a central tension rod is conveniently used to unite the end covers, sleeve and rotor into a unitary package, other suitable clamping arrangements could alternatively be used; for example, such unity could be achieved through appropriate interconnection between the end covers and the sleeve. Likewise, although it is convenient and effective to provide a pressure balancing annular surface centrally of the inward face of each end cover, one or more chambers having inward facing surfaces could alternatively be employed and appropriately connected to an adjacent region of high pressure fluid. Similarly, although it is convenient to use a short oblique bleed passageway between the high pressure passageway in an end cover and the axial cavity therein which opens onto the pressure-balancing chamber in the end cover inward end face, a bleed passageway could be drilled or otherwise suitably formed directly between the chamber and the high pressure passageway or between the axial cavity and the pressurized seawater plenum chamber. Moreover, as previously mentioned, for whatever reason, such a pressure-balancing effect could be employed at only one end cover of the pressure exchanger, or the construction could be such that each of the end covers was separately and individually balanced in this manner without the communication axially through a chamber somewhere in the rotor. Furthermore, if desired that high pressure brine could be used to provide the balance axial force for both end covers by locating the bleed passageway 73 instead in the brine end cover. Particular features of the invention are set forth in the claims that follow.

The invention claimed is:

1. A pressure exchange apparatus for transferring pressure energy from a high pressure first fluid to a lower pressure second fluid to provide a pressurized second fluid, which apparatus comprises:

a rotatably mounted cylindrical rotor having a pair of opposite planar end faces with at least two channels extending axially therethrough and between openings located in said planar end faces;

a pair of end covers having inward and outward end faces, with said inward end faces interfacing with and slidingly and sealingly engaging said end faces of said rotor, each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover [plate] being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover;

at least one pressure-balancing chamber which is in fluid communication with an inward-facing surface of at least one said end cover *and has an annular surface located centrally of said inward end face of said at least one end cover*; and means connecting said chamber to either the high pressure first fluid or to the pressurized second fluid*, which connecting means includes a generally radial passageway in said end cover which opens into the inlet or discharge passageway for the higher pressure fluid in said end cover,* so that last-named end cover is subjected to relatively equal forces upon said inward and outward end faces thereof.

2. The apparatus according to claim 1 wherein pressure-balancing chambers are provided adjacent an inward-facing surface of each of said end covers, which chambers are in pressure communication with each other so that both end covers are subjected to relatively equal forces upon said inward and outward end faces thereof.

[3. The apparatus according to claim 1 wherein said pressure-balancing chamber has an annular surface located centrally of said inward end face of said at least one end cover.]

4. The apparatus according to [claim 3] *claim 1* wherein a tubular sleeve surrounds said rotor and opposite ends of said sleeve respectively contact said inward-facing surfaces of said end covers along the peripheries thereof.

[5. The apparatus according to claim 3 wherein said fluid communication between said pressure-balancing chamber and the high-pressure fluid includes a generally radial passageway in said end cover which opens into the inlet or discharge passageway for the higher pressure fluid in said end cover.]

6. The apparatus according to [claim 5] *claim 1* wherein said at least one end cover includes an axial cavity which is in communication with said pressure-balancing chamber and said radial passageway communicates therewith.

7. The apparatus according to claim 1 wherein a generally axial cavity extends through said rotor between said opposite end faces and in fluid communication with said pressure-balancing chamber and with a similar pressure-balancing chamber having an inward-facing surface that is provided in said other end cover.

8. The apparatus according to claim 7 where said other end cover also includes an axial cavity extending therethrough and wherein a rod extends between said end covers and through said axial cavities in said end covers and said rotor to create a unitary arrangement.

9. A pressure exchange apparatus for transferring pressure energy from a high pressure first fluid to a lower pressure second fluid to provide a pressurized second fluid, which apparatus comprises:

a rotatably mounted cylindrical rotor having a pair of opposite planar end faces with at least two channels extending axially therethrough and between openings located in said planar end faces;

a tubular sleeve surrounding said rotor in which said rotor rotates *about its axis*;

a pair of end covers having inward and outward end faces, with said inward end faces contacting end faces of said sleeve and interfacing with and slidingly and sealingly engaging said end faces of said rotor,

*a pair of end closure assemblies disposed respectively axially outward of each said end cover and providing a plenum chamber in contact with said respective end cover,* each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover [plate] being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover; and means for supporting central regions of said inward end faces of said end covers so that axial forces on the respective outward end faces do not deform said end covers *in the form of pressure-balancing chambers which are provided adjacent an inward-facing surface of each of said end covers, which chambers are in pressure communication with each other via a cavity that extends through said rotor along its axis between said opposite end faces so that both end covers are subjected to relatively equal forces upon said inward and outward end faces thereof.*

[10. The apparatus according to claim 9 wherein pressure-balancing chambers are provided adjacent an inward-facing surface of each of said end covers, which chambers are in pressure communication with each other so that both end covers are subjected to relatively equal forces upon said inward and outward end faces thereof.]

11. The apparatus according to [claim 10] *claim 9* wherein each said pressure-balancing chamber is bounded by an annular surface located centrally of said inward end face of said end cover.

[12. The apparatus according to claim 10 wherein a cavity extends coaxially through said rotor between said opposite end faces which is in fluid communication with said pressure-balancing chambers.]

13. The apparatus according to claim 9 wherein the peripheries of both end covers are supported by said tubular sleeve [and wherein said central regions are supported by a rigid member that extends through a coaxial chamber in said rotor].

14. The apparatus according to [claim 13] *claim 25* wherein said rigid member is a tube about which said rotor rotates, with opposite end faces of said tube contacting the inward end faces of said end covers.

15. The apparatus according to [claim 13] *claim 25* wherein a threaded rod extends through said coaxial chamber and parts affixed to said rod engage said central regions of said inward end faces of said end covers when threaded nut means on said rod clamps said tubular sleeve between said end covers.

16. A method for transferring pressure energy from a high pressure first fluid stream to a lower pressure second fluid stream using a pressure exchanger, which method comprises:

supplying the high pressure first fluid stream to an inlet passageway in a first end cover at one end of the pressure exchanger to direct said first fluid to a rotating cylindrical rotor having a pair of opposite, generally planar end faces with at least two channels extending axially therethrough and between openings located in the opposite end faces;

supplying the lower pressure second fluid stream to an inlet passageway in a second end cover at an opposite end of the pressure exchanger to direct said second fluid into opposite ends of the channels in the rotating rotor, each of the end covers having inward and outward end faces, which inward end faces interface with and slidingly and sealingly engage the respective end faces of the rotor, each end cover also having one discharge passageway in addition to the inlet passageway, which passageways in each end cover are angularly separated from each other so that each channel in the rotor can communicate with only one passageway in each end cover at the same time,

*supporting the peripheries of both end covers by a tubular sleeve within which said rotor rotates,* rotation of said rotor causing said channel openings, in alternating sequence, to be brought into partial or full alignment with an inlet passageway in one end cover and a discharge passageway in the other end cover, and then into partial or full alignment with a discharge passageway in the one end cover and an inlet passageway in the other end cover;

said high pressure first fluid being supplied to said first end cover via an inlet chamber that is in fluid communication with the outward end face of the first end cover, and said pressurized second fluid being discharged from the pressure exchanger through a discharge chamber that is in fluid communication with the outward end face of said second end cover, and supporting *central regions of* inward end faces of the end covers*, by a rigid member that extends through an axial chamber in said rotor,* against deformation by axial forces that are applied by said high pressure first fluid stream and said pressurized second fluid stream to outward end faces thereof.

[17. The method according to claim 16 wherein axial forces on said outward and inward end faces are balanced by providing at least one pressure-balancing chamber which is in fluid communication with an inward facing surface of at least one said end cover and which is also in fluid communication with (a) either said high pressure incoming first fluid stream or said pressurized second fluid stream being discharged from the pressure exchanger, and (b) a chamber that extends axially through said rotor, which is in communication with a similar such pressure-balancing chamber in the other of the end covers.]

[18. The method according to claim 16 wherein the peripheries of both end covers are supported by a tubular sleeve within which said rotor rotates and central regions are supported by a rigid member that extends through an axial chamber in said rotor.]

19. The method according to [claim 18] *claim 16* wherein said rigid member is a tube about which said rotor rotates, with opposite end faces of said tube contacting the inward end faces of said end covers to provide said support.

20. The method according to [claim 18] *claim 16* wherein a rod extends through said axial chamber and parts affixed to said rod engage said central regions of the inward end faces of said end covers to provide said support.

*21. An end cover for inclusion as a part of a pressure exchange apparatus for transferring pressure energy from a high pressure first fluid to a lower pressure second fluid to provide a pressurized second fluid, which apparatus includes a rotatably mounted cylindrical rotor having a pair of opposite planar end faces with at least two channels extending axially therethrough and between channel openings located in said planar end faces;*

*said end cover comprising a body which has:*

*(a) inward and outward end faces, with said inward end face interfacing with and slidingly and sealingly engaging one end face of said rotor,*

*(b) an inlet passageway and a discharge passageway, with said inlet passageway and said discharge passageway being constantly sealed from each other during the operation by a sealing region at the interface between said rotor end face and said end cover, whereby said channel openings in said rotor during rotation of said rotor, in alternating sequence, come into partial or full alignment with said inlet passageway in one end cover and then into partial or full alignment with said discharge passageway;*

*(c) a pressure-balancing chamber which is in fluid communication with said inward end face and which is formed with an annular surface located centrally of said inward end face of said end cover; and*

*(d) means including a generally radial bleed passageway which opens into the higher pressure fluid passageway connecting said central pressure-balancing chamber to said passageway that will be filled with the higher pressure fluid during operation so that said end cover is subjected to relatively equal forces upon said inward and outward end faces thereof.*

*22. The end cover according to claim 21 wherein said end cover includes an axial cavity which is in communication with said pressure-balancing chamber and said radial passageway.*

*23. The end cover according to claim 21 wherein a plurality of holes are provided in said inward end face adjacent the periphery thereof which receive pins that interconnect said end cover and a tubular sleeve that surrounds the rotor.*

*24. The apparatus according to claim 13 wherein a rod about which said rotor rotates extends through said rotor cavity and wherein threaded nuts on said rod clamp said end covers to said tubular sleeve.*

*25. A pressure exchange apparatus for transferring pressure energy from a high pressure first fluid to a lower pressure second fluid to provide a pressurized second fluid, which apparatus comprises:*

*a rotatably mounted cylindrical rotor having a pair of opposite planar end faces with at least two channels extending axially therethrough and between openings located in said planar end faces;*

*a tubular sleeve surrounding said rotor in which said rotor rotates;*

*a pair of end covers having inward and outward end faces, with said inward end faces contacting end faces of said sleeve and interfacing with and slidingly and sealingly*

*engaging said end faces of said rotor, the peripheries of both end covers being supported by said tubular sleeve,*

*each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover; and*

*a rigid member that extends through a coaxial chamber in said rotor and supports central regions of said inward end faces of said end covers so that axial forces on the respective outward end faces do not deform said end covers.*

*26. A pressure exchange apparatus for transferring pressure energy from a high pressure first fluid to a lower pressure second fluid to provide a pressurized high pressure second fluid, which apparatus comprises:*

*a cylindrical rotor mounted to rotate about its axis having a pair of opposite planar end faces with at least two channels extending axially therethrough and between openings located in said planar end faces;*

*a pair of end covers having inward and outward end faces, with said inward end faces interfacing with and slidingly and sealingly engaging said end faces of said rotor, each said end cover having one inlet passageway and one discharge passageway, said passageways being located so that an inlet passageway in one said end cover is aligned with one said channel in said rotor when a discharge passageway in the other said end cover is aligned with the same channel, said inlet passageway and said discharge passageway in each said end cover being constantly sealed from each other during the operation by a sealing region at the interface between said rotor end face and said end cover, whereby said channel openings during rotation of said rotor are, in alternating sequence, brought into partial or full alignment with an inlet passageway in one said end cover and a discharge passageway in the other said end cover and then into partial or full alignment with a discharge passageway in said one end cover and an inlet passageway in said other end cover;*

*a pair of end closure assemblies disposed respectively axially outward of said end covers and providing a plenum chamber for flow of high pressure fluid in contact with an outward end face of said respective end cover,*

*a pressure-balancing chamber which has a 360° annular, inward-facing surface that is disposed at the axial center of at least one said end cover; and*

*means connecting said chamber in fluid communication to either the high pressure first fluid or to the pressurized second fluid so that last-named end cover is subjected to relatively equal forces upon said inward and outward end faces thereof.*

*27. The apparatus according to claim 26 wherein one said pressure-balancing chamber is provided adjacent an inward-facing surface of each of said end covers, which pressure-balancing chambers are in pressure communication with each other so that both said end covers are subjected to relatively equal forces upon said inward and outward end faces thereof.*

*28. The apparatus according to claim 26 wherein a tubular sleeve surrounds said rotor and opposite ends of said sleeve respectively contact said inward-facing surfaces of said end covers along the peripheries thereof.*

*29. An end cover for inclusion as a part of a pressure exchange apparatus for transferring pressure energy from a high pressure first fluid to a lower pressure second fluid to provide a pressurized second fluid, which apparatus includes a cylindrical rotor for rotatation about an axis which has a pair of opposite planar end faces and at least two channels extending axially therethrough and between openings in said planar end faces, said end cover being one of a pair that axially flank said rotor and are respectively located between a pair of end cover assemblies that respectively provide a plenum chamber for flow of high pressure fluid located axially outward of and in contact with each said end cover;*

*said end cover comprising a body which has:*

*(a) inward and outward end faces, with said inward end face interfacing with and slidingly and sealingly engaging one planar end face of said rotor,*

*(b) an inlet passageway and a discharge passageway that are constantly sealed from each other during operation by a sealing region at the interface between said rotor planar end face and said end cover, whereby said channel openings in said rotor during rotation of said rotor, in alternating sequence, come into partial or full alignment with said inlet passageway in one end cover and then into partial or full alignment with said discharge passageway in said one end cover;*

*(c) a pressure-balancing chamber which has a 360° annular, inward-facing surface that is disposed at the axial center of said end cover; and*

*(d) means connecting said pressure-balancing chamber in fluid communication to said passageway in said end cover that will be filled with the higher pressure fluid during operation so that said end cover is subjected to relatively equal forces upon said inward and outward end faces thereof.*

* * * * *